United States Patent [19]

Olson

[11] 4,160,433

[45] Jul. 10, 1979

[54] MODULATING AIR CONTROL VALVE

[75] Inventor: Donel R. Olson, Huntington Beach, Calif.

[73] Assignee: Olson Engineering Inc., Huntington Beach, Calif.

[21] Appl. No.: 878,640

[22] Filed: Feb. 17, 1978

[51] Int. Cl.² .......................................... F02M 23/04
[52] U.S. Cl. .......................... 123/124 R; 123/119 D; 137/480
[58] Field of Search ....... 123/124 R, 119 D, 119 DB; 60/293; 137/480

[56] References Cited

U.S. PATENT DOCUMENTS

| | | | |
|---|---|---|---|
| 3,353,524 | 11/1967 | Sarto | 123/124 R X |
| 3,913,541 | 10/1975 | Scott, Jr. | 123/124 R X |
| 4,044,732 | 8/1977 | Inada et al. | 123/119 D |

Primary Examiner—Wendell E. Burns
Attorney, Agent, or Firm—Knobbe, Martens, Olson, Hubbard & Bear

[57] ABSTRACT

An improved modulating air control valve which intermittently introduces air into the intake manifold of internal combustion engines as a function of the vacuum differential between the intake manifold and the ported vacuum at the carburetor. The valve includes a unidirectional flow valve which prevents hydrocarbon gases contained in the intake manifold from deteriorating the internal diaphragm of the valve.

14 Claims, 4 Drawing Figures

MODULATING AIR CONTROL VALVE

BACKGROUND OF THE INVENTION

This invention relates to a vacuum modulating air control valve which significantly reduces exhaust emissions by intermittently introducing air into the intake manifold of internal combustion engines under certain operating conditions. More particularly, the invention relates to a modulating air control valve having a unidirectional flow valve, or check valve, which prevents deterioration of the internal components of the valve, thereby significantly increasing the operational life span of the valve.

Due to recent air quality control regulations passed by both federal and state legislatures, the automotive industry has developed various emission control devices to reduce the exhaust pollutants of internal combustion engines. These devices have been numerous in nature and have typically included closed crankcase ventilation systems, spark advance servo mechanisms and catalytic converters. However, recently it has been discovered that exhaust emissions can be substantially reduced by use of a modulating air control valve which introduces ambient air directly into the intake manifold of an internal combustion engine in an amount determined by the vacuum differential between the intake manifold and a vacuum signal source, such as the ported vacuum at a carburetor. The ambient air introduced into the intake manifold in such manner, provides a more complete burning of the fuel at a lower combustion temperature thereby decreasing the formation of pollutants.

Typically, the prior art modulating air control valves utilize a resilient diaphragm which cooperates with a valve seat. This diaphragm opens and closes air bleed orifices within the valve in response to pressure differentials between the ported vacuum source and the intake manifold of the engine. When the diaphragm is modulated away from the valve seat, a plurality of small flow orifices are opened to allow ambient air to pass through the valve and into the intake manifold. Alternatively, when the diaphragm is biased against the valve seat, air flow through these orifices is discontinued. Although these control valves reduce pollutants during initial operation, their effectiveness rapidly diminishes during prolonged use.

One of the major deficiencies of the prior art modulating air control valves is the rapid degradation of the resilient diaphragm. Due to the diaphragm being in direct flow communication with the intake manifold, hydrocarbon fumes produced in the intake manifold during engine operation which are not entirely scavanged through the exhaust system tend to migrate toward and contact the diaphragm during engine-off conditions. These hydrocarbon fumes react with the elastomeric diaphragm material, causing the diaphragm to swell and lose its resiliency and eventually even split or crack. This swelling and loss of resiliency either causes the valve to leak during engine operation or inhibits the opening of the valve.

A further deficiency of the prior art valves is their failure to protest against "backfires" which occasionally occur during engine operation. A "backfire" results from the premature detonation of the air/fuel mixture within the intake manifold of an engine. This premature detonation or explosion causes a high pressure pulse to be transmitted toward the valve. The pulse in many instances causes carbon or dirt particles contained in the intake manifold to lodge into the diaphragm and valve and, in extreme instances, even causes the valve body to crack or shatter.

Additionally, the plurality of small air orifices of the prior art valve tend to become clogged with dirt particles even during normal usage, thereby severely restricting the amount of ambient air introduced into the intake manifold.

In most instances, such deterioration of the diaphragm or clogging of the flow orifices requires a complete replacement of the valve.

SUMMARY OF THE INVENTION

The present invention provides a vacuum modulating air control valve which substantially prevents hydrocarbon fumes from deteriorating the resilient diaphragm, shields the valve body from possible damages due to manifold backfires, and allows easy access to the internal components of the valve, thereby significantly extending the operational life span of the valve.

The modulating air control valve is composed of two housing segments having central apertures therethrough which are fastened together by a plurality of snap flanges. On the downstream housing segment, and adjacent one end thereof, an enlarged valve seat is formed concentric with the central aperture, and a plurality of small air orifices are positioned radially outward thereof. Disposed and clamped between the two housing segments is a resilient diaphragm which communicates with the valve seat and air orifices.

Adjacent to the other end of the downstream housing segment and extending partially therethrough is formed an enlarged conical cavity in which is positioned a ball and spring assembly. This assembly acts as a check valve allowing air flow in only the downstream direction.

When the resilient diaphragm is cooperating with the valve seat, the diaphragm prohibits any flow of air past the valve seat, and the check valve prohibits any hydrocarbon gases from moving upstream and contacting the diaphragm. Alternatively, when the diaphragm moves away from the valve seat, the plurality of air orifices are open, allowing air to pass downstream past the valve seat and through the check valve, which is opened by the pressure differential between ambient and the intake manifold.

It can, therefore, be seen that the present invention comprises an effective and economical modulating air control valve in which the diaphragm is effectively isolated from hydrocarbon gases. These and other features of the present invention will become more apparent upon reference to the drawings wherein.

DETAILED DESCRIPTION OF THE PREFERRED EMBODIMENT

Figure 1:
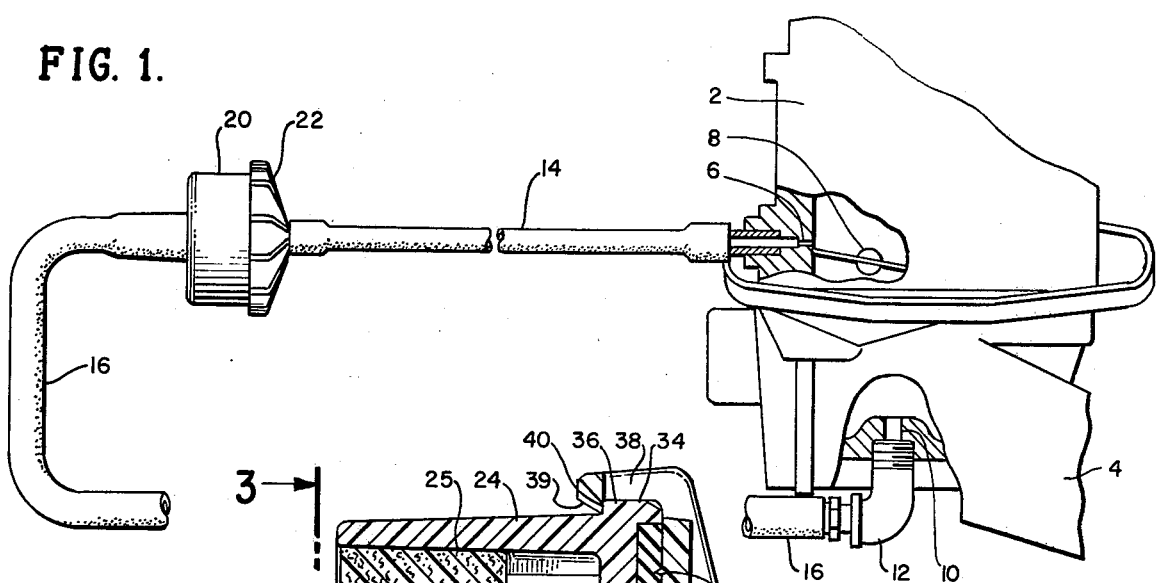
FIG. 1 is a schematic view showing the modulating air control valve installed in a vacuum line between a carburetor vacuum advance port and an intake manifold.

Referring to FIG. 1, there is shown a vacuum modulating air control valve 20 of the present invention connected in a typical vacuum system used in internal combustion engines. A down-draft type carburetor 2 having a throttle valve 8 pivotally mounted therein regulates the flow of the fuel/air mixture into an intake manifold 4. The carburetor 2 is provided with a vacuum advance port 6 which is located at the off-idle position of the carburetor, slightly above the throttle valve 8.

An air injection port 10 is located on one wall of the intake manifold 4, and a conduit fitting or elbow 12 is fastened thereto. The modulating air control valve 20 of the present invention is connected in series with the conduits 14 and 16 extending from the vacuum advance port 6 to the air injection port 10, respectively.

Figure 2:
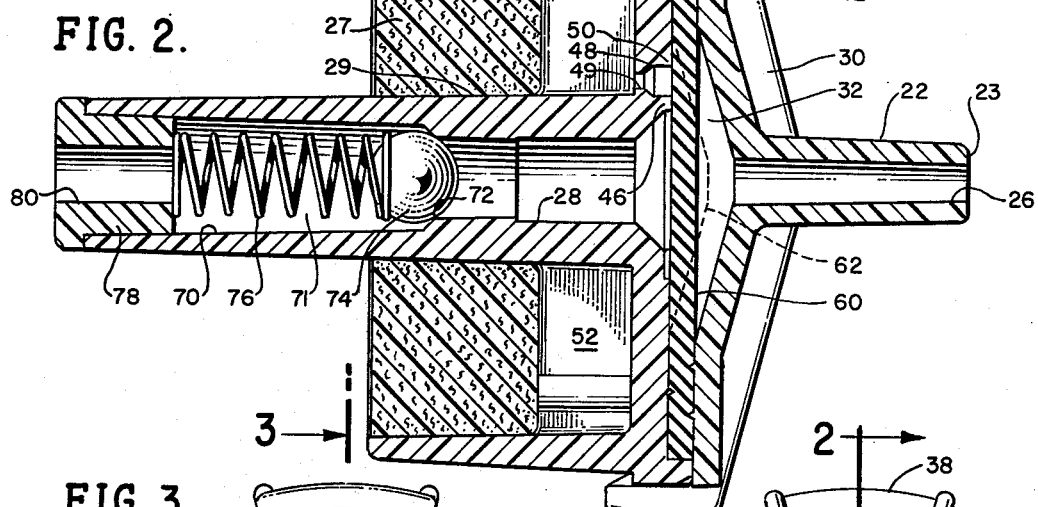
FIG. 2 is an enlarged, cross-sectional view taken along line 2—2 of FIG. 4 showing the internal components of the modulating air control valve.

Referring to FIG. 2, the internal components and configuration of the modulating air control valve can be seen. The valve 20, which is preferably molded of plastic, consists of two interlocking annular housing segments 22 and 24 having apertures 26 and 28, respectively, therethrough. Extending radially outward from a hub or axis portion 23 of housing segment 22 are a plurality of reinforcement ribs 30 which form six flange clips 38 which extend from the segment 22 and have bevelled faces 39. These flange clips 38 form an annular recess 34, the diameter of which is slightly greater than the diameter of the rim 36 of housing segment 24.

To assemble the two housing segments 22 and 24, axial pressure is manually applied to both housing segments, thereby forcing the bevelled faces 39 of housing segment 22 to contact the rim 36 of housing segment 24. As the axial pressure is continued, the rim 36 cams against the bevelled faces 39, forcing the flange clips 38 to flex radially outward. This outward flexing of the flange clips 38 permits the rim 36 of the housing segment 24 to enter into the annular recess 34 formed in the housing segment 22. As the bevelled faces 39 clear the annular shoulder 40 of the rim 36, the flange clips 38 resiliently flex back to their unstressed position shown in the figures, thereby registering and securely fastening the two housing segments 22 and 24 together.

Disassembly of the two housing segments 22 and 24 to facilitate cleaning and inspection of the internal components of the valve may be easily accomplished by manually flexing the flange clips 38 radially outward, and then withdrawing the housing segment 24. It can readily be understood that the snap flange clip 38 interlock design of the present invention facilitates easy disassembly, maintenance, and inspection of the internal components of the valve.

Figure 3:
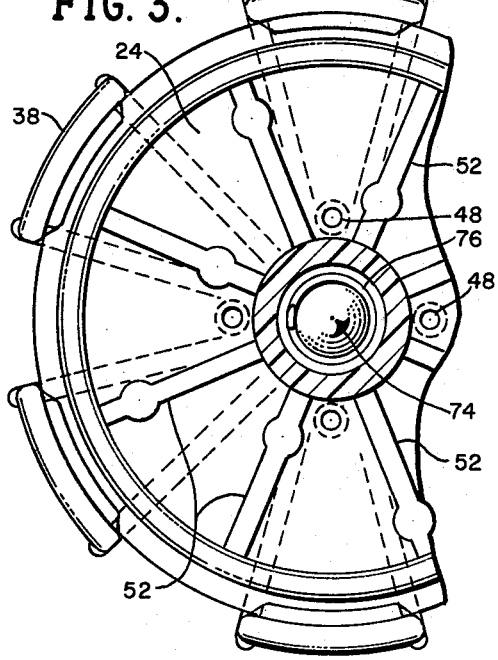
FIG. 3 is an enlarged cross-sectional view taken along line 3—3 of FIG. 2 showing the snap flanges of the modulating air control device.
Figure 4:
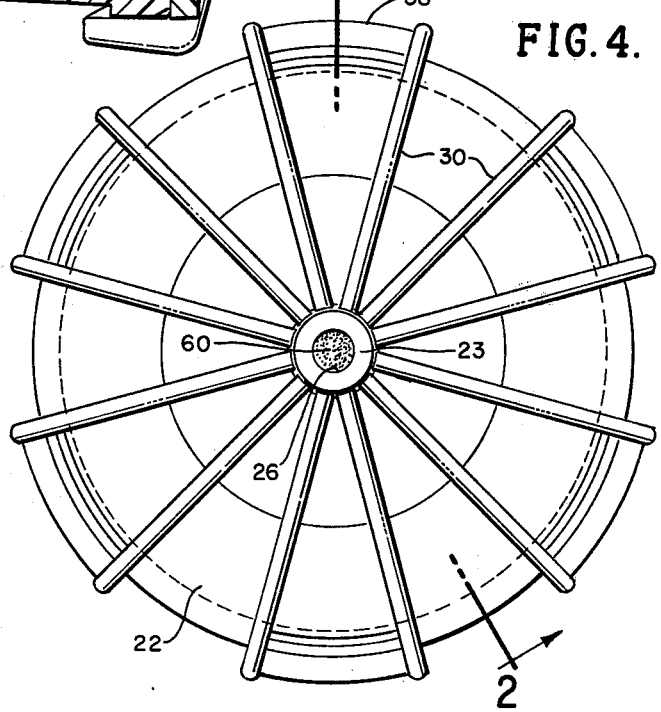
FIG. 4 is an enlarged plan view showing the flange reinforcing ribs of the modulating air control valve.

Again referring to FIG. 2, an annular valve seat 46 is formed in the housing segment 24 at the end thereof adjacent the housing segment 22 and is concentric with the central aperture 28. Symmetrically spaced and positioned radially outward from the valve seat 46 (as shown in FIG. 3) are four small orifices 48 having differing sized external and internal diameters 49 and 50, respectively. These orifices 48 provide an inlet for the ambient air entering the valve.

A plurality of symmetrically spaced supporting ribs 52 initiate at the center hub 29 and extend to the outer annular wall 25 of the housing segment 24. These supporting ribs 52 provide the structural integrity of the housing segment 24 and prevent the rim 36 from flexing during the assembly of the two housing segments 22 and 24. Filter material 27 is disposed within the ring-like cavity formed between the outer annular wall 25 and the center hub 29 of the housing segment 24. This filter, preferably made of polyurethane foam, prevents dirt particles from lodging in the small air orifices 48 or traveling through the valve 21.

Additionally, a conical aperture 70 forming an enlarged cavity 71 initiates adjacent to the other end of the housing segment 24 and extends partially therethrough, forming an annular shoulder 72. A nylon ball 74, the diameter of which is greater than the diameter of the annular shoulder 72 but less than the minimum diameter of the conical aperture 70, is disposed within the enlarged cavity 71 and is biased against the annular shoulder 72 by a spring 76. The ball 74 and spring 76 assembly is secured in position by a retainer cap 78 having an aperture 80 therethrough. The cap 78 is inserted and permanently affixed to the conical aperture 70.

Disposed between the two housing segments 22 and 24 is a resilient diaphragm 60 which cooperates with the valve seat 46 and the small orifices 48, and also serves to seal the two housing segments 22 and 24 together. The diaphragm 60 is secured in place by 3 annular ridges 42 which are integrally formed in both housing segments 22 and 24. The axial pressure exerted by the flange clips 38 against the annular shoulder 40 presses the annular ridges 42 into the resilient diaphragm 60, thereby clamping the diaphragm adjacent to its maximum diameter tightly against both housing segments 22 and 24 but allowing the diaphragm to modulate or flex in the region near the valve seat 46.

The operation of the modulating air control valve 20 in the system of FIG. 1 can now be described. As shown in FIG. 1, the throttle valve 8 of the carburetor 2 is depicted in the idle position, wherein the carburetor throat is closed downstream of the vacuum advance port 6. Thus, in this condition, i.e., when the accelerator pedal (not shown) is not depressed, the vacuum advance port 6, conduit 14, and cavity 32 are maintained at atmospheric pressure.

Additionally, in this idle condition, the vacuum port 10 of the intake manifold 4 is maintained at a partial vacuum by the operation of the engine, thereby causing the downstream conduit 16 and central aperture 28 of the housing segment 24 to attain a partial vacuum level. This partial vacuum draws the diaphragm 60 toward housing segment 24, thereby sealing the diaphragm 60 against the valve seat 46, separating the orifices 48 from the aperture 28 and prohibiting any flow of air through the valve.

During gradual acceleration, i.e., when the accelerator pedal (not shown) is partially depressed, the throttle valve 8 rotates in a clockwise direction to a position above the vacuum advance port 6. In this position, the vacuum advance port 6 is partially shielded from atmospheric pressure and is exposed to the vacuum maintained in the intake manifold 4 of the engine. This vacuum level is quickly communicated to the cavity 32 of the air control valve 20 by the conduit 14. When the absolute pressure on the control side of the diaphragm (i.e., the side of the diaphragm exposed to cavity 32) is less than absolute pressure on the opposite side of the diaphragm, the resilient diaphragm 64 flexes away from housing segment 24 into the cavity 32 to a position indicated by the dotted line 62 in FIG. 2, thus moving away from the valve seat 46 and the small orifices 48.

Further, the differential between ambient air pressure and the downstream vacuum communicated through conduit 16 is sufficient to overcome the slight biasing force of the spring 76 and draw the ball 74 downstream away from the annular shoulder 72. In this position, i.e., with the diaphragm 60 positioned at the dotted line 62 and the ball 74 downstream of the shoulder 72, the downstream vacuum draws ambient air into the valve 20 through the orifices 48 and allows the air to flow across the seat 46, around the ball 74, and into the intake manifold 4. As previously stated, this air introduced into the intake manifold during gradual acceleration conditions provides a more complete burning of the fuel at a lower combustion temperature with a resulting decrease in exhaust pollutants.

During rapid acceleration conditions, i.e., when the accelerator pedal (not shown) is fully depressed, the throttle valve 8 rotates clockwise to a substantially open position, thereby exposing the vacuum advance port 6 to atmospheric pressure. Due to the previous downstream level of vacuum attained during gradual acceleration and the rapid decay of the vacuum in housing segment 22 encountered during rapid acceleration conditions, a pressure differential exists across the diaphragm 60 which quickly seats the diaphragm 60 against the valve seat 46 and prohibits flow of air through the valve. This discontinuance of air introduced in the intake manifold 4 during full acceleration conditions is conducive to increased engine performance and reduced exhaust pollutants.

As can be easily understood, the valve 20 basically operates in a latching function, wherein, as soon as the diaphragm 60 unseats itself, ambient air entering the valve instantaneously increases the pressure differential across the diaphragm 60 thereby causing the valve to rapidly latch to an open position. This instantaneous latching function allows the diaphragm 60 to modulate in response to the varying vacuum levels encountered during engine operation and vary the ambient air flow entering the intake manifold 4.

Referring again to FIG. 2, the unidirectional flow characteristics of the present invention may be described. As previously mentioned, the hydrocarbon fumes produced in the intake manifold during engine operation are not entirely expelled through the exhaust system when the engine is shut off. During this engine-off condition, these hydrocarbon gases migrate towards the valve 20 through the conduit 16. However, due to the spring 76 biasing the ball 74 tightly against the annular shoulder 72, any gas migration beyond the annular shoulder 72 is prohibited. Thus, the hydrocarbon gases are confined within the intake manifold 4, conduit 16, and conical aperture 71 and are prevented from contacting the elastomeric diaphragm 60. This effective isolation of the diaphragm 60 from hydrocarbon fumes prevents any degradation of the resilient diaphragm material and substantially increases their operational lifespan of the valve 20.

Additionally, the unidirectional flow feature of the present invention provides effective "backfire" protection to the valve 20. During engine operation, a backfire condition occasionally develops wherein the air/fuel mixture prematurely detonates or explodes within the intake manifold 4. This explosion causes a high pressure pulse of hydrocarbon gas to be transmitted towards the valve 20 through the conduit 16. Referring to FIG. 2, it can be seen that as this high pressure pulse approaches the spring and ball assembly 76 and 74, respectively, a pressure differential exists across the ball 74, i.e., high pressure in the conical cavity 71 and atmospheric or vacuum pressure in the aperture 28. This pressure differential causes the ball 74, aided by the biasing force of the spring 76, to quickly seat against the annular shoulder 72. Thus, the high pressure pulse is prevented from contacting the diaphragm 60 and is effectively contained within the conduit 16 and the conical aperture 71 which, due to their structural design, are capable of withstanding high pressures without cracking or shattering.

It therefore can be seen that the modulating air control valve of the present invention significantly reduces exhaust emissions of internal combustion engines by providing ambient air into the intake manifold as a function of the engine vacuum and additionally substantially increases operational life of the valve by isolating the resilient diaphragm from the migration of hydrocarbon gases contained in the intake manifold and the high pressure pulses occasionally transmitted during backfire conditions.

What is claimed is:

1. In an internal combustion engine comprising an intake manifold maintained at partial vacuum and having an air injection port formed thereon, a carburetor having a throttle valve pivotally mounted therein, a vacuum advance port located adjacent said throttle valve to produce a variable vacuum source, a first conduit connected to said vacuum advance port, and a second conduit connected to said air injection port, a modulating air control valve connected to be controlled by said first conduit, said valve, under such control, supplying regulated amounts of ambient air to said second conduit to selectively introduce ambient air into said intake manifold in an amount regulated by engine vacuum, said valve comprising:

a valve body having an aperture therethrough with an annular seat;

orifice means for admitting ambient air into said valve;

diaphragm means for cooperating with said annular seat, said diaphragm being movable from said annular seat in response to a pressure differential to permit ambient air to flow into said intake manifold; and a unidirectional flow valve responsive, when said diaphragm admits ambient air into said valve, to the pressure differential between ambient and said intake manifold to allow air to flow into said intake manifold, but preventing hydrocarbon gases contained in said intake manifold from flowing toward said diaphragm or said orifice means.

2. The exhaust emission control system of claim 1 wherein said orifice means comprises a plurality of small flow orifices positioned radially outward from said annular seat.

3. The exhaust emission control system of claim 1 wherein said diaphragm means comprises a resilient diaphragm which is subject to deterioration if contacted by said hydrocarbon gases.

4. The exhaust emission control system of claim 1 wherein said unidirectional flow valve comprises a ball and spring assembly located in said aperture, said spring biasing said ball against an annular shoulder formed in said aperture in a direction toward said diaphragm.

5. An emission control system as defined in claim 4 wherein said ball is movable away from said annular shoulder in response to a pressure differential between ambient pressure and said intake manifold when said diaphragm admits ambient air to said valve, said ball being seated against said shoulder whenever said diaphragm is closed against said annular seat.

6. The exhaust emission control system of claim 1 wherein said valve body comprises:
a first and second housing segment;
said first housing segment having an aperture therethrough with an enlarged cavity adjacent one end thereof and a plurality of flange clip means extending radially outward;
said second housing segment having an aperture therethrough with an enlarged cavity adjacent one end thereof and a plurality of flange clip means extending radially outward;
said second housing segment having an aperture therethrough with said annular seat formed adjacent one end thereof; and
said plurality of flange clip means positively locking said first and said second housing segments together.

7. An exhaust emission control system as defined in claim 6 wherein said diaphragm means is disposed between said first and second housing segments.

8. The exhaust emission control system of claim 7 wherein an annular ring is formed adjacent one end of both said first and said second housing segments, said annular ring cooperating with said diaphragm means to resiliently seal said first and said second housing segments together.

9. A modulating air control valve for use in controlling exhaust pollutants in internal combustion engines, comprising:
a valve body comprising first and second body segments providing a central aperture including a valve seat;
orifice means extending through said second body segment for admitting ambient air into said valve;
separation means for cooperating with said valve seat to separate said second body segment from said orifice means, said separation means being movable from said valve seat in response to a pressure differential; and
a unidirectional flow valve disposed in said central aperture in said second housing segment to permit air flow through the valve in one direction only, said modulating air control valve periodically introducing air into an intake manifold of an internal combustion engine in response to varying engine vacuum.

10. The modulating air control valve of claim 9 wherein said orifice means comprises a plurality of flow orifices positioned radially outward from said valve seat.

11. The modulating air control valve of claim 9 wherein said separation means comprises a resilient diaphragm which seals said first and second housing segments together and which is subject to deterioration if contacted by gases from said intake manifold.

12. The modulating air control unit of claim 9 wherein said first and second housing segments each include an annular ring adjacent one end thereof, said annular ring sealing said separation means to said valve.

13. The modulating air control valve of claim 9 wherein said first housing segment includes a plurality of radially extending flexible flange clips positioned around its outside diameter, said flange clips engaging the outside diameter of said second housing segments, thereby securely locking said first and second housing segments together.

14. The modulating air control valve of claim 9 wherein said unidirectional flow valve comprises a spring and ball assembly disposed within said central aperture.

* * * * *